(12) United States Patent
Naumann et al.

(10) Patent No.: US 7,706,927 B2
(45) Date of Patent: Apr. 27, 2010

(54) CIRCUIT BREAKER CONFIGURATION

(75) Inventors: Michael Naumann, Feucht (DE);
Markus Miklis, Pfeifferhütter (DE);
Peter Meckler,
Pommelsbrunn-Hohenstadt (DE); Patric Gross, Schwarzenbruck-Lindelburg (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 139 days.

(21) Appl. No.: 11/705,264

(22) Filed: Feb. 12, 2007

(65) Prior Publication Data

US 2007/0138873 A1    Jun. 21, 2007

Related U.S. Application Data

(63) Continuation of application No. PCT/EP2005/008347, filed on Aug. 2, 2005.

(30) Foreign Application Priority Data

Aug. 10, 2004    (DE) .................. 20 2004 012 469

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02H 3/08 | (2006.01) |
| H02H 9/02 | (2006.01) |
| H01H 75/00 | (2006.01) |
| H01H 77/00 | (2006.01) |
| H01H 83/00 | (2006.01) |

(52) U.S. Cl. .................. 700/292; 361/93.2; 335/14; 335/20

(58) Field of Classification Search ................ 361/93.2, 361/93.4; 700/292
See application file for complete search history.

(56) References Cited

U.S. PATENT DOCUMENTS

| | | | | |
|---|---|---|---|---|
| 4,038,585 | A | | 7/1977 | Wolski et al. |
| 4,681,061 | A | * | 7/1987 | Dvorak et al. ............... 116/279 |
| 4,713,636 | A | * | 12/1987 | Lemmer et al. ............... 335/35 |
| 5,185,705 | A | * | 2/1993 | Farrington ................... 700/292 |
| 5,206,638 | A | * | 4/1993 | McKeown ................... 370/446 |
| 5,253,159 | A | * | 10/1993 | Bilas et al. .................... 700/22 |
| 5,373,411 | A | * | 12/1994 | Grass et al. ................... 361/64 |

(Continued)

FOREIGN PATENT DOCUMENTS

DE        102 48 640 A1    4/2004

(Continued)

Primary Examiner—Elvin G Enad
Assistant Examiner—Alexander Talpalatskiy
(74) Attorney, Agent, or Firm—Laurence A. Greenberg; Werner H. Stemer; Ralph E. Locher

(57) ABSTRACT

A circuit breaker configuration contains a number of circuit breakers each to be connected via lines to a system component of a power distribution system and a plurality of control buttons with a respective one of the control buttons connected to a respective one of the circuit breakers. The respective control button for the respective circuit breaker passes through a control panel and is actuated from a front side of the control panel. A coupling element accessible from the front side of the control panel is provided for an interchange of diagnosis data and/or parameterization data. The coupling element is associated with the circuit breakers.

7 Claims, 2 Drawing Sheets

U.S. PATENT DOCUMENTS

| | | | | |
|---|---|---|---|---|
| 5,705,862 A * | 1/1998 | Lutz et al. | ............ | 307/147 |
| 5,875,087 A * | 2/1999 | Spencer et al. | ............ | 361/87 |
| 5,909,180 A * | 6/1999 | Bailey et al. | ............ | 340/639 |
| 5,982,596 A * | 11/1999 | Spencer et al. | ............ | 361/64 |
| 6,005,758 A * | 12/1999 | Spencer et al. | ............ | 361/64 |
| 6,157,527 A * | 12/2000 | Spencer et al. | ............ | 361/64 |
| 6,195,243 B1 * | 2/2001 | Spencer et al. | ............ | 361/64 |
| 6,212,049 B1 * | 4/2001 | Spencer et al. | ............ | 361/64 |
| 6,313,980 B1 | 11/2001 | Craft et al. | | |
| 6,381,503 B1 * | 4/2002 | Dollhopf et al. | ............ | 700/22 |
| 6,545,479 B1 * | 4/2003 | Dollar et al. | ............ | 324/424 |
| 6,681,110 B1 * | 1/2004 | Crookham et al. | ............ | 455/420 |
| 6,731,079 B2 * | 5/2004 | Andersen | ............ | 315/312 |
| 6,734,380 B2 * | 5/2004 | Gerard et al. | ............ | 200/307 |
| 6,798,209 B2 * | 9/2004 | Lavoie et al. | ............ | 324/424 |
| 6,813,525 B2 * | 11/2004 | Reid et al. | ............ | 700/19 |
| 7,136,724 B2 * | 11/2006 | Enberg | ............ | 700/295 |
| 7,385,406 B1 * | 6/2008 | Blades | ............ | 324/713 |
| 2002/0010518 A1 * | 1/2002 | Reid et al. | ............ | 700/31 |
| 2002/0062180 A1 * | 5/2002 | Enberg | ............ | 700/286 |
| 2002/0181178 A1 * | 12/2002 | Ortiz et al. | ............ | 361/78 |
| 2003/0132753 A1 * | 7/2003 | Lavoie et al. | ............ | 324/424 |
| 2003/0222603 A1 * | 12/2003 | Mogilner et al. | ............ | 315/294 |

FOREIGN PATENT DOCUMENTS

| | | |
|---|---|---|
| EP | 1 385 015 A2 | 1/2004 |
| JP | 56086036 A | 7/1981 |
| JP | 6506101 T | 7/1994 |
| JP | 11008930 A | 1/1999 |

* cited by examiner

US 7,706,927 B2

CIRCUIT BREAKER CONFIGURATION

CROSS-REFERENCE TO RELATED APPLICATIONS

This is a continuation, under 35 U.S.C. §120, of copending international application No. PCT/EP2005/008347, filed Aug. 2, 2005, which designated the United States; this application also claims the priority, under 35 U.S.C. §119, of German patent application No. DE 20 2004 012 469.9, filed Aug. 10, 2004; the prior applications are herewith incorporated by reference in their entirety.

BACKGROUND OF THE INVENTION

Field of the Invention

The invention relates to a circuit breaker configuration having a number of circuit breakers, which are each connected via lines to a system component of a power distribution system. In this case, circuit breakers are intended to mean in particular line circuit breakers for protecting current-carrying lines in a low-voltage system.

Such a circuit breaker configuration is generally part, in particular, of a switchgear cabinet of a complex assembly or airplane power supply system having circuit breakers, which are held in a control panel in the form, for example, of a control board and whose control buttons are passed through the control panel via corresponding leadthrough openings from a rear side of the control panel and toward a front side.

The control buttons of the circuit breakers are used, in particular, for manually tripping the respective circuit breaker in order to switch the corresponding or affected line path and the system component of the power distribution system associated therewith such that they do not carry a current or voltage. In addition, the control button, in general owing to its respective position or change in position, indicates a circuit breaker which has tripped in the event of a fault owing to an overload of the lines to be protected of the affected line path.

SUMMARY OF THE INVENTION

It is accordingly an object of the invention to provide a circuit breaker configuration, which overcomes the hereinmentioned disadvantages of the heretofore-known devices of this general type, which in addition to merely the control function, diagnosis and/or parameterization functions are also made possible.

With the foregoing and other objects in view there is provided, in accordance with the invention, a circuit breaker configuration. The circuit breaker configuration contains a number of circuit breakers each to be connected via lines to a system component of a power distribution system and a plurality of control buttons with a respective one of the control buttons connected to a respective one of the circuit breakers. The respective control button for the respective circuit breaker passes through a control panel and is actuated from a front side of the control panel. A coupling element accessible from the front side of the control panel is provided for an interchange of diagnosis data and/or parameterization data. The coupling element is associated with the circuit breakers. The coupling element provides a bus-free data interchange with the power distribution system and is connected within the respective circuit breaker to a line terminal of the system component associated with the respective circuit breaker.

In this regard, the coupling element, which is likewise accessible from the front side of the control panel, for the interchange of diagnosis and/or parameterization data is associated with the or each circuit breaker.

In this case, the invention is based on the consideration that, first, the circuit breakers of such a circuit breaker configuration are increasingly equipped with local intelligence in the form, in particular, of a, for example, processor-assisted processing unit and therefore, in addition to the actual protective function, can also take on monitoring and control functions. Second, an access option should be made possible for the resulting diagnosis and/or parameterization functions even in the case of ready-installed circuit breakers while avoiding retrofitting of a data bus system, which is generally complex for such purposes. This can be achieved by virtue of the fact that diagnosis or parameterization of the circuit breakers and/or of the system components, which are coupled to the circuit breakers, of the power distribution system is made possible from the control side. As a result, configuring the devices for such diagnosis or parameterization purposes is as unnecessary as a data bus system.

In one advantageous configuration, the coupling element, which is accessible from the front side of the control panel, for data interchange is configured for diagnosis or parameterization purposes for bidirectional data interchange. In this case, the coupling element may be in the form of a transmission and/or reception device for wireless data interchange. Here, in principle optical data transmission, for example by infrared, or else acoustic data transmission, for example by ultrasound, is conceivable. Radio data transmission can also be used. In principle, the coupling element can also be configured for data interchange using cables, lines or wires, expediently in the form of an electrical connecting connection or plug-in connection.

As regards the geometrical configuration, the coupling element can be provided in the control panel, preferably in the direct vicinity of the respective control button of the associated circuit breaker, or preferably in the control button itself. The control button is in this case also understood to mean a control element in the form of an actuating button, an actuating rocker or the like.

The breaker-internal coupling or connection of the coupling element can be provided via a processing unit, which is provided in the respective circuit breaker, for measuring and/or controlling breaker-relevant data or switching elements. The coupling element for data interchange with the power distribution system or the corresponding system component can also be connected within the breaker to a line terminal of the system component associated with the respective circuit breaker.

In order to prevent an overvoltage, originating from the power distribution system, at the diagnosis device when a diagnosis or parameterization device is connected via the coupling element provided in the control panel, an auxiliary switching element is expediently connected into the breaker-internal connection between the coupling element and the line terminal. In this case, the auxiliary switching element (auxiliary switch) interacts with a main switching element (main switch) of the circuit breaker such that data interchange with the respective system component of the power distribution system can only take place when the main switch is open and, as a result of the coupling, the auxiliary switch is closed.

The advantages achieved by the invention consist in particular in the fact that, owing to the configuration of a coupling element, which is accessible from the front side of a control panel of a circuit breaker configuration, data interchange with breaker-internal components, on the one hand, and with system components, which are connected to the respective circuit breaker, of a power distribution system, on the other hand, is made possible without a bus. The data interchange expediently takes place via a diagnosis or parameterization device, which has a corresponding coupling point or interface in order to write or read diagnosis and/or parameterization data likewise from the front side of the control panel. It is thus possible, via such bus-free data interchange via the corresponding coupling elements, for measurement and fault data, which may be buffer-stored in the circuit breaker, to be read and for parameterization data for configuring the circuit breaker monitoring the respective lines of the power distribution system, such as specific line or system data, for example, to be written to the circuit breaker or, via said circuit breaker, to the respective system component of the power distribution system.

Other features which are considered as characteristic for the invention are set forth in the appended claims.

Although the invention is illustrated and described herein as embodied in a circuit breaker configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
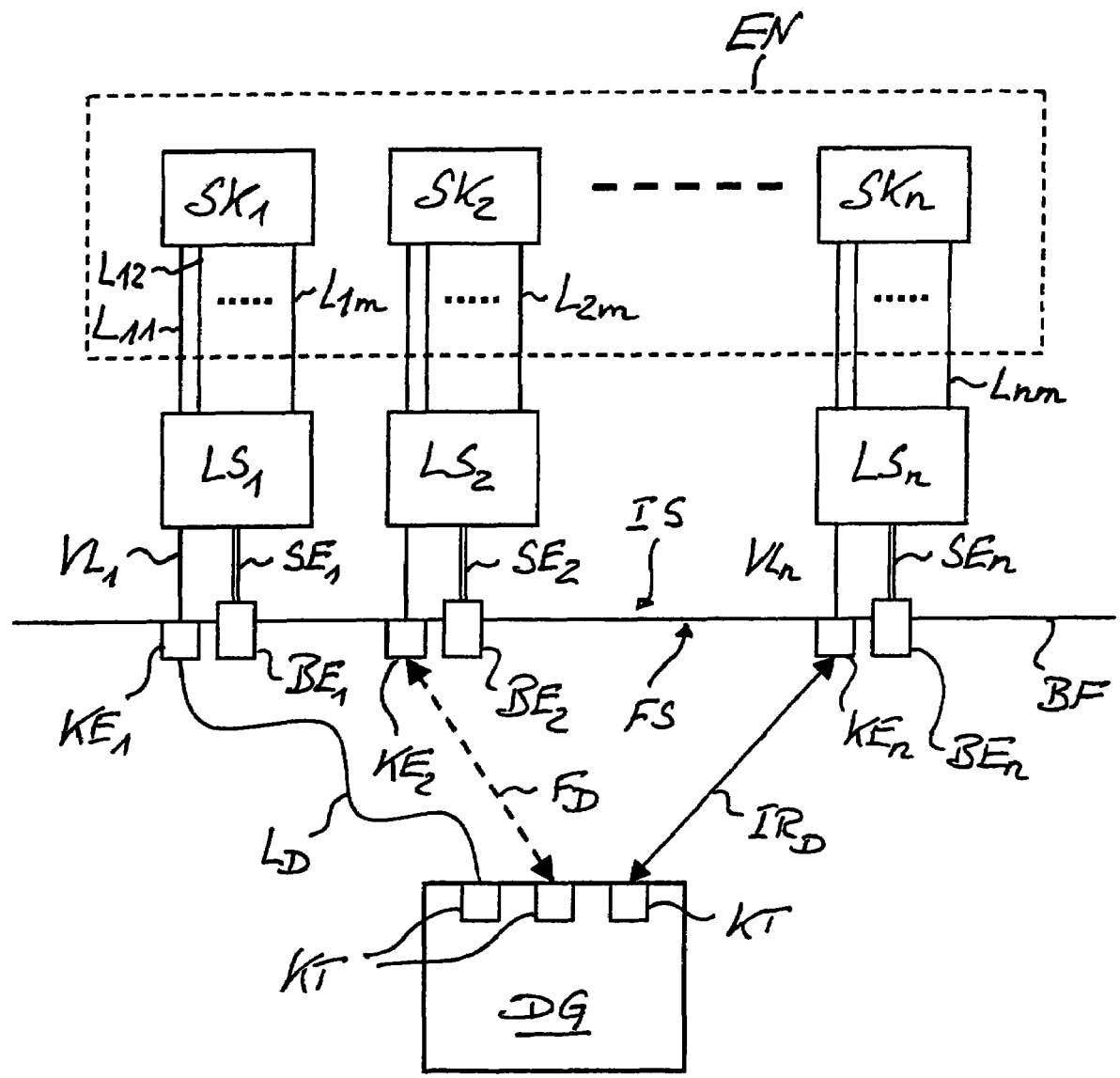
FIG. 1 is a block circuit diagram of a circuit breaker configuration of a power distribution system having control and coupling elements disposed in a control panel and a diagnosis device for data interchange according to the invention.

Mutually corresponding parts are provided with the same reference symbols in all of the figures. Referring now to the figures of the drawing in detail and first, particularly, to FIG. 1 thereof, there is shown a schematic of a circuit breaker configuration having a number of line circuit breakers $LS_{1...n}$, which are connected via lines $L_{11}...L_{1m}$ to in each case one system component $SK_{1...n}$ of a power distribution system or power supply system EN.

A control element $BE_{1...n}$, which will be referred to below as a control button, is associated with each line circuit breaker $LS_{1...n}$, which will be referred to below as a circuit breaker. The respective control button $BE_n$, which may also be in the form of an actuating button or an actuating rocker, is coupled to the respective circuit breaker $LS_n$ mechanically via a corresponding switching element $SE_n$. The control button $BE_n$ of the respective circuit breaker $LS_n$ is disposed in a control panel BF and is passed there to the outside toward an outer side in a manner which is not illustrated in any more detail, via through-openings from a housing or device inner side IS, for example the interior of a switchgear cabinet or power supply system cabinet, and is therefore accessible and capable of being actuated from the front side FS of the control panel BF.

In the exemplary embodiment shown in FIG. 1, a coupling element $KE_{1...n}$ is provided physically adjacent to the or each control button $BE_{1...n}$, which coupling element is likewise accessible from the front side FS of the control panel BF. The respective coupling element $KE_n$ is device-internal, i.e. is connected to the respective circuit breaker $LS_n$, for example via a connecting line $VL_n$, on the inner side IS, which is opposite the front side FS, of the control panel BF.

The coupling element $KE_n$ is used for data interchange with a schematically illustrated diagnosis device DG. The diagnosis device has a coupling part KT, which is complementary to the respective coupling element $KE_n$, wherein, as illustrated symbolically, an electrical connection $L_D$ using cables or lines or else a wireless connection $IR_D$, $F_D$ can be realized via correspondingly configured coupling elements $KE_n$ or coupling parts KT for data interchange. Optical data interchange via an infrared path $IR_D$ with, for example, coupling elements $KE_n$ in the form of infrared transmitters and receivers or else radio data interchange via a radio path $F_D$ can therefore take place. For this purpose, the coupling elements $KE_n$ are then in the form of corresponding transmission and reception devices.

Figure 2:
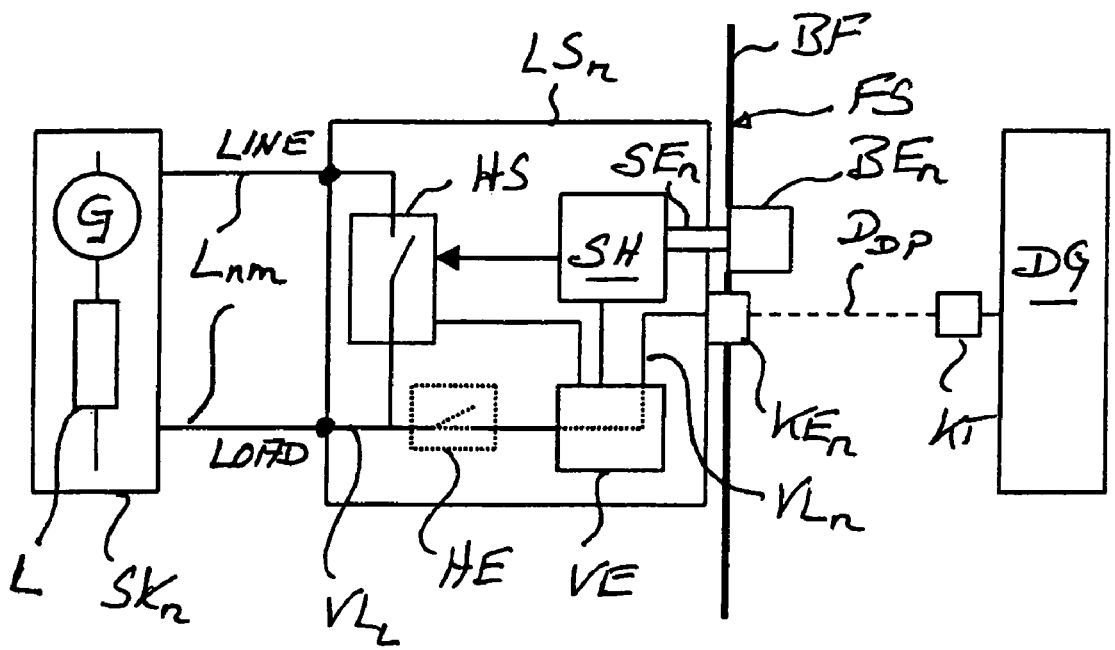
FIG. 2 is a block circuit diagram of a variant embodiment having a coupling element, which is disposed in the control panel and is coupled directly to the corresponding circuit breaker.
Figure 3:
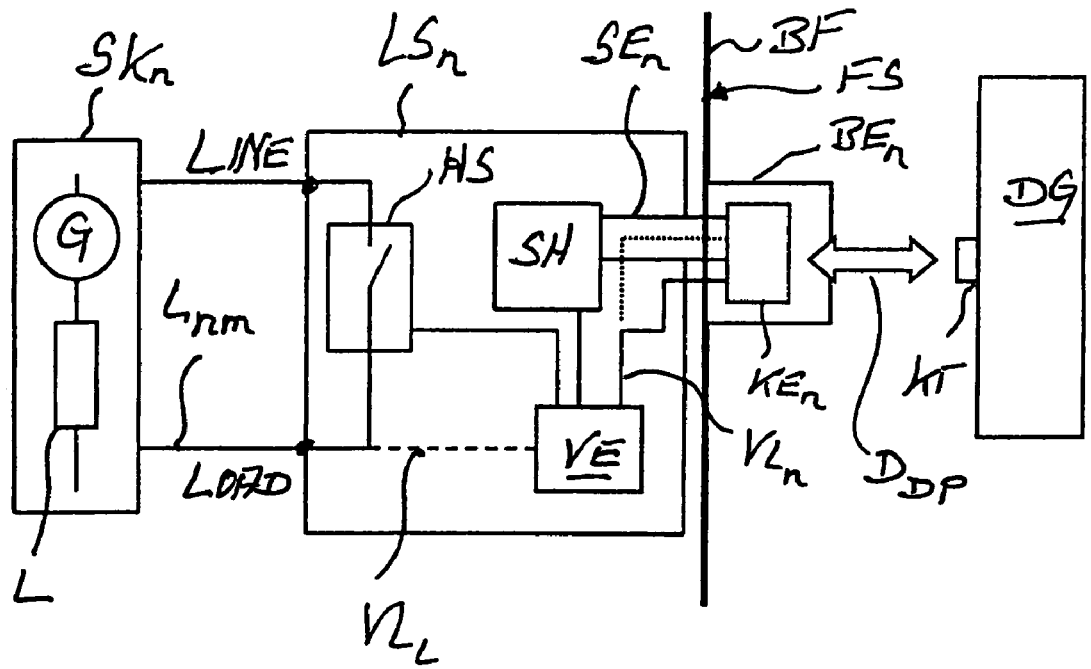
FIG. 3 is a block circuit diagram of an embodiment having the coupling element disposed in the control element of the circuit breaker.

FIGS. 2 and 3 show the basic configuration of a circuit breaker $LS_n$ having a mechanical, electromechanical or electronic switching mechanism SH and having a main switching element or main switch HS, which is coupled to the switching mechanism SH, in the form of mechanical switching contacts or of an electronic or semiconductor switch, for example in the form of a field effect transistor. A further component part of the circuit breaker $LS_n$ is expediently a processing unit VE. The processing unit VE is used, on the one hand, for controlling the switching mechanism SH and/or the main switch HS and, on the other hand, for picking up, storing and processing measured values detected within the circuit breaker LS.

The main switch HS is connected, via the lines $L_{nm}$ to be monitored, to the respective system component $SK_n$, which is symbolized by a generator G and a load L. In general, the output of the circuit breaker $LS_n$ facing the supply of the system component $SK_n$ is in this case referred to as a LINE terminal, while the terminal of the circuit breaker $LS_n$ which faces the consumer or the load L of the system component $SK_n$ is referred to as LOAD.

Illustrated using dashed lines in FIG. 2 is also an auxiliary switching element HE, which is provided within the breaker and is connected into a breaker-internal connecting line $VL_L$ to the LOAD terminal of the circuit breaker $LS_n$. The connecting line $VL_L$ is passed to the coupling element $KE_n$ provided in the control panel or front panel BF via the processing unit or the logic VE of the circuit breaker $LS_n$. A direct connection from the coupling element $KE_n$ via the auxiliary switching element HE to the LOAD terminal of the circuit breaker $LS_n$ can also be provided, as illustrated by dashed lines. The auxiliary switching element HE, which is also referred to below as the auxiliary switch, and the main switch HS are in this case coupled to one another, in particular via the processing unit VE or via a separate front-side additional contact, such that the auxiliary switch HE is only closed when the main switch HS is open. An overvoltage at the coupling element $KE_n$ and, via this, at the diagnosis device DG is therefore reliably avoided.

In the exemplary embodiment shown in FIG. 2, the coupling element $KE_n$ is coupled directly to the circuit breaker $LS_n$. For this purpose, a direct connecting contact between the coupling element and the circuit breaker $LS_n$, in particular via its breaker housing, may exist in a manner which is not illustrated in any more detail.

Data interchange with the circuit breaker $LS_n$ and, possibly via the circuit breaker, with the respective system component $SK_n$ and via the coupling element $KE_n$ takes place with the diagnosis and/or parameterization device DG, which can likewise be operated from the front side FS of the control panel BF. In this case, the data interchange can take place, as symbolized by the double arrow in FIG. 3, optically, acoustically or by radio and therefore in wireless fashion or, as symbolized by the dashed-line connection in FIG. 2, using cables or lines. For this purpose, the diagnosis device has the corresponding coupling point or interface KT for such wireless data interchange or data interchange using wires.

In the preferred embodiment, in particular in the case of tight physical or spatial conditions with a correspondingly small-area control panel BF, as shown in FIG. 3, the coupling element $KE_n$ is integrated in the control element BE. The breaker-internal line connection $VL_n$ can in this case, as illustrated by dashed lines, also take place via the mechanical switching element $SE_n$ in the connection between the control button BE and the switching mechanism SH. In this embodiment, an auxiliary switching element HE is not shown, in which case the breaker-internal configuration with or without auxiliary switching element or auxiliary switch HE and with or without processing unit VE, both in the embodiment with a separate through-opening for the coupling element $KE_n$ through the control panel BF and in the embodiment with a coupling element $KE_n$ integrated in the control button BE can be provided.

The data interchange via the respective coupling element $KE_n$ preferably takes place bidirectionally. For this purpose, control data and parameters or parameterization data $D_{DP}$ can be transmitted from the diagnosis device DG, via the respective coupling element $KE_n$, into the processing unit VE of the respective circuit breaker $LS_n$ and/or via the circuit breaker to the respective system component $SK_n$. The control, diagnosis or parameterization data $D_{DP}$ can in this case be stored or buffer-stored in the processing unit VE and/or passed on from there to the system component $SK_n$ and also read from the diagnosis device DG again. Line parameters can also be buffer-stored in the processing unit VE. Measured values and diagnosis data, in particular also from the system or the system component $SK_n$, such as coupling impedances and system-specific parameters, for example, can likewise be buffer-stored in the processing unit VE and read, by the diagnosis device DG.

In addition, data or parameters can be read from the system component $SK_n$ and therefore system states queried by the diagnosis device DG via the coupling element $KE_n$. In this case, too, system-specific data, fault messages and/or measured values can in turn be buffer-stored in the processing unit VE of the circuit breaker $LS_n$ and read at the given time via the coupling element $KE_n$ by the diagnosis device DG.

Diagnosis and/or parameterization data $D_{DP}$ are therefore written and read in a bus-free manner via the coupling element $KE_n$ of the respective circuit breaker $LS_n$ from the control or front side FS without intervention in the installation side of the circuit breaker $LS_n$, i.e. on the inner side IS of the device or housing which is opposite the front side FS, being required for this purpose.

We claim:

1. A circuit breaker configuration, comprising:
   a number of circuit breakers, each circuit breaker to be connected via lines to a different one system component of a power distribution system;
   a plurality of control buttons, each one of said control buttons being connected to a respective one of said circuit breakers, said respective control button for said respective circuit breaker passing through a control panel and being actuated from a front side of the control panel; and
   a coupling element accessible from the front side of the control panel for an interchange of diagnosis data and/or parameterization data, said coupling element associated with said circuit breakers, said coupling element for bus-free data interchange with the power distribution system being connected within said respective circuit breaker to a line terminal of the system component associated with said respective circuit breaker; wherein said circuit breakers each includes: a breaker-internal connection between said coupling element and the line terminal; and an auxiliary switching element connected into said breaker-internal connection between said coupling element and the line terminal.

2. The circuit breaker configuration according to claim 1, wherein said coupling element is configured for bidirectional data interchange.

3. The circuit breaker configuration according to claim 1, wherein said coupling element is a transmission and/or reception device for data interchange.

4. The circuit breaker configuration according to claim 1, wherein said coupling element is disposed in the control panel.

5. The circuit breaker configuration according to claim 1, wherein said coupling element is disposed in a vicinity of or in said control button of the respective circuit breaker.

6. The circuit breaker configuration according to claim 1, wherein:
   said circuit breakers each have a breaker-internal processing unit and breaker elements; and
   said coupling element is connected to said breaker-internal processing unit of said respective circuit breaker for measuring and/or controlling breaker-relevant data or said breaker elements.

7. The circuit breaker configuration according to claim 1, wherein:
   said circuit breakers each has a main switching element; and
   said auxiliary switching element is coupled to said main switching element of said respective circuit breaker such that data interchange with the respective system component only takes place when said main switching element is open.

* * * * *